(12) United States Patent
Aronoff

(10) Patent No.: US 10,579,213 B2
(45) Date of Patent: Mar. 3, 2020

(54) GRAVITY COMPOSER

(71) Applicant: Facebook, Inc., Menlo Park, CA (US)

(72) Inventor: Brendan Benjamin Aronoff, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 543 days.

(21) Appl. No.: 14/804,085

(22) Filed: Jul. 20, 2015

(65) Prior Publication Data

US 2017/0024116 A1    Jan. 26, 2017

(51) Int. Cl.
*G06F 3/0482* (2013.01)
*G06F 3/0488* (2013.01)
*G06F 3/0481* (2013.01)

(52) U.S. Cl.
CPC ........ *G06F 3/0482* (2013.01); *G06F 3/04817* (2013.01); *G06F 3/04883* (2013.01)

(58) Field of Classification Search
CPC . G06F 3/04883; G06F 3/0482; G06F 3/04817
See application file for complete search history.

(56) References Cited

U.S. PATENT DOCUMENTS

| | | | | |
|---|---|---|---|---|
| 2011/0209099 A1* | 8/2011 | Hinckley | .............. | G06F 3/0483 715/863 |
| 2012/0167003 A1* | 6/2012 | Johansson | ........... | G06F 3/04855 715/786 |
| 2012/0216143 A1* | 8/2012 | Shiplacoff | ............. | G06F 3/0416 715/784 |
| 2013/0254693 A1* | 9/2013 | Oh | ........................ | G06F 3/0482 715/769 |
| 2014/0181714 A1* | 6/2014 | Anderson | ........... | G06F 3/04817 715/769 |
| 2014/0218343 A1* | 8/2014 | Hicks | .................. | G06F 3/04883 345/179 |
| 2015/0062052 A1* | 3/2015 | Bernstein | .............. | G06F 3/0416 345/173 |

(Continued)

OTHER PUBLICATIONS

HowTech, "How to Work with the Dock Settings on a Mac", (Dec. 27, 2012), <URL https://www.youtube.com/watch?v=KYSiX8cMTVM/>, p. 1-3 (Year: 2012).*

(Continued)

*Primary Examiner* — Ajay M Bhatia
*Assistant Examiner* — Mong-Shune Chung
(74) *Attorney, Agent, or Firm* — Baker Botts L.L.P.

(57) ABSTRACT

A method includes presenting a UI of a first application on a screen of a computing device and detecting a user input. For example, the detected user input may be an input tracing a continuous path on the screen of the computing device, and the path may include a first gesture extending from a first location to a second location on the screen followed by a second gesture extending from the second location to a third location on the screen. In response to detecting the first gesture, the computing device may display an interactive menu of the first application, the interactive menu comprising a plurality of menu options. In response to the detecting the second gesture, the computing device may identify one of the menu options. In response to detecting user input indicating completion of the second gesture, the computing device may determine the selection of the identified menu option.

20 Claims, 17 Drawing Sheets

(56) References Cited

U.S. PATENT DOCUMENTS

2016/0041702 A1* 2/2016 Wang .................... G06F 3/0482
                                                                             715/830

OTHER PUBLICATIONS

Wonderhowto, "Customize your dock in Mac OS X", (Mar. 16, 2010), <URL https://operating-systems.wonderhowto.com/how-to/customize-your-dock-mac-os-x-296863/>, p. 1-18 (Year: 2010).*

* cited by examiner

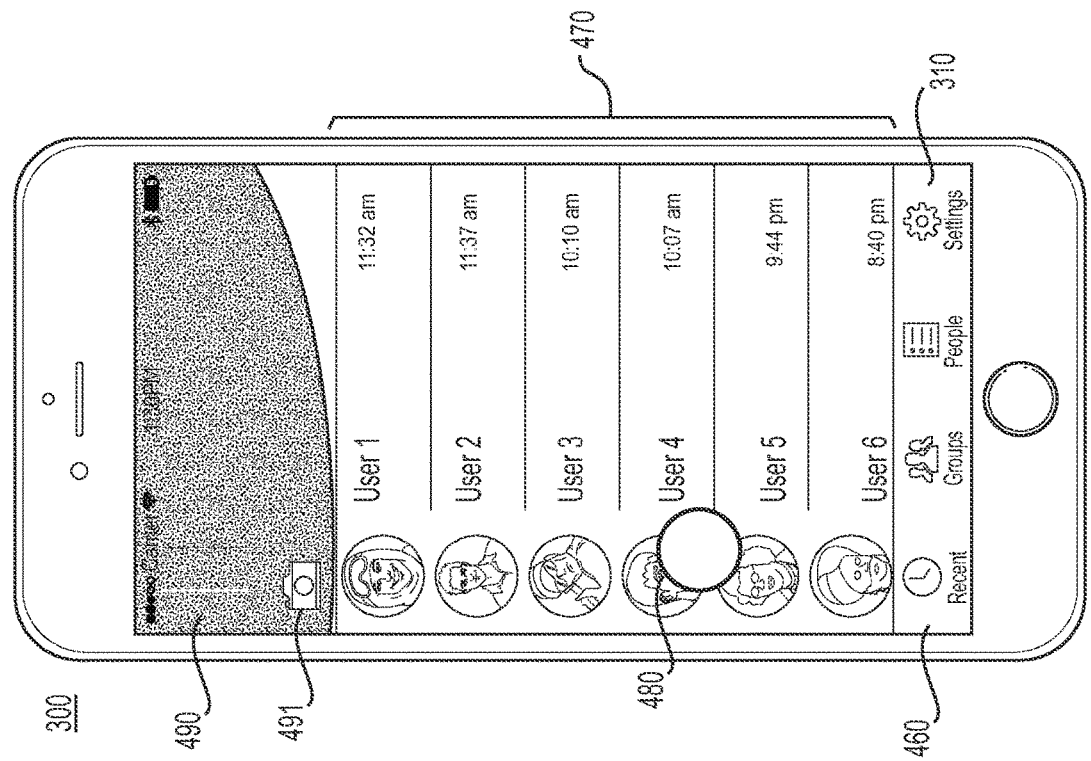
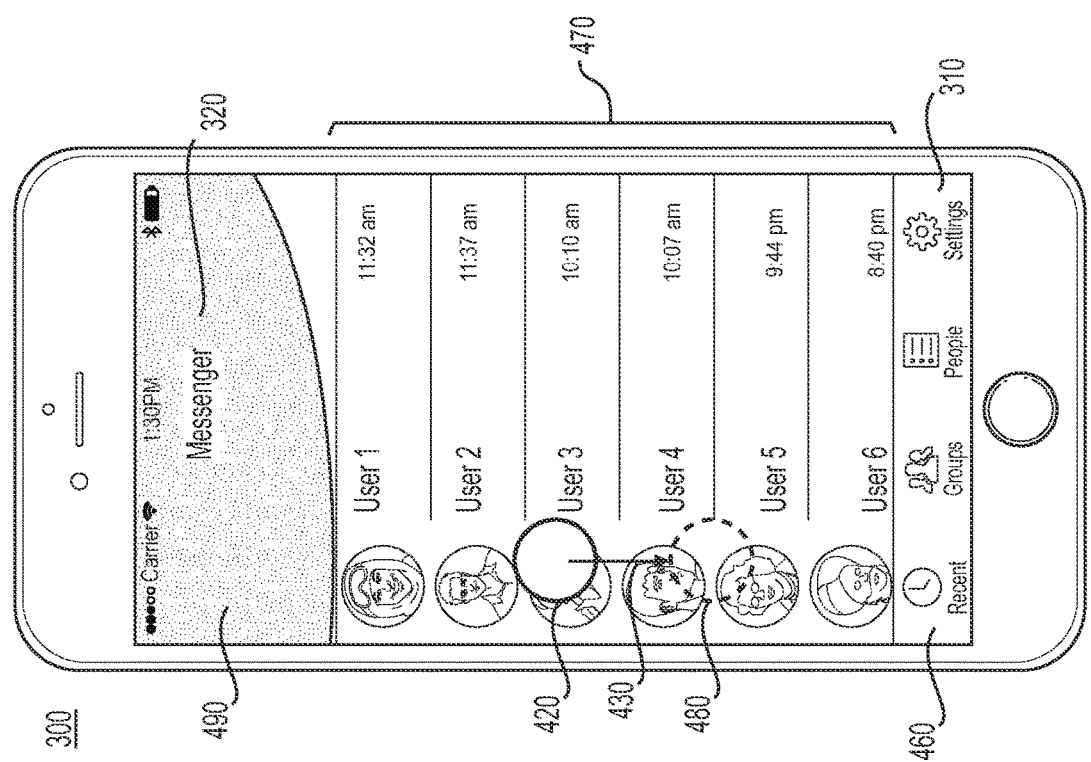

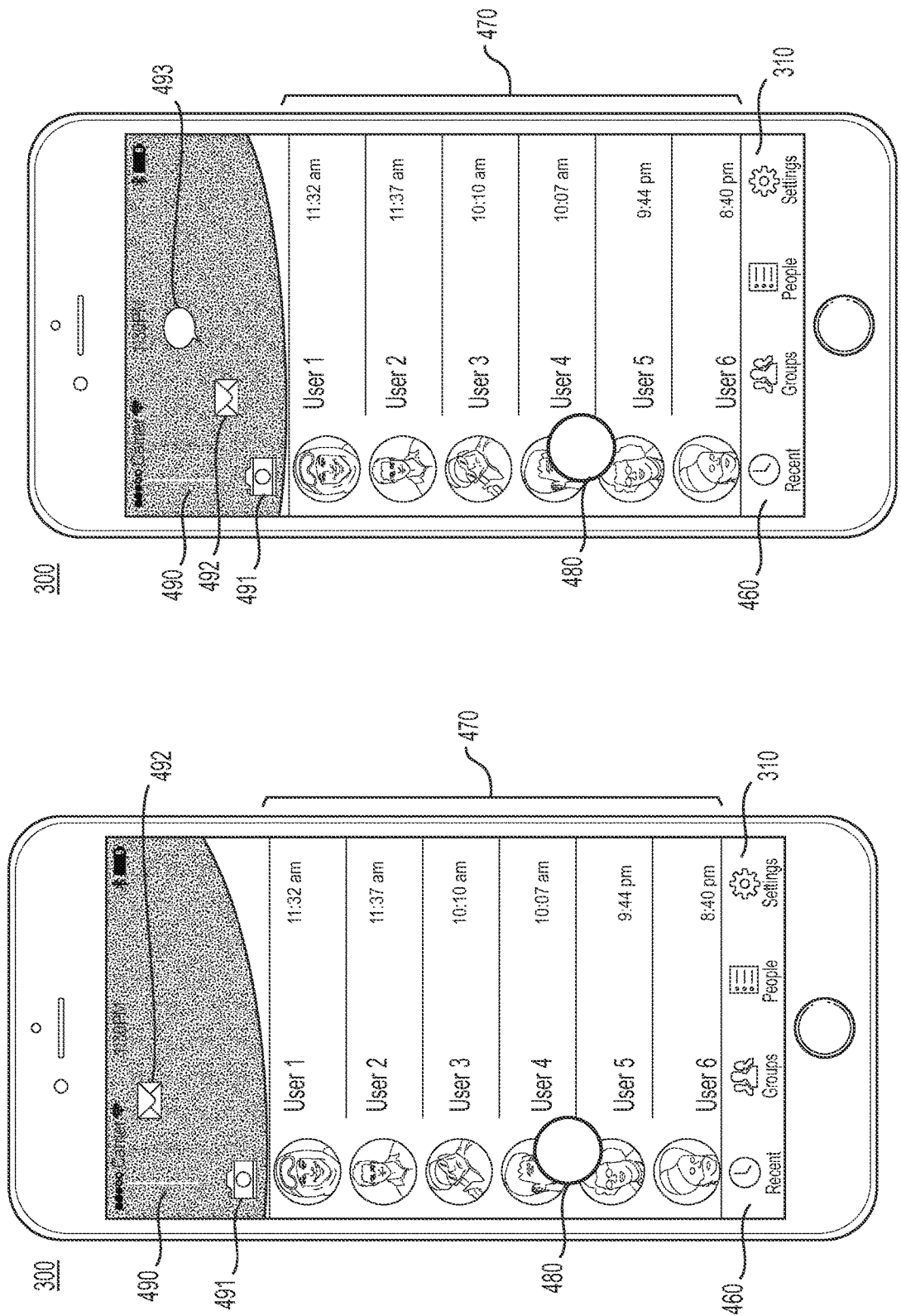

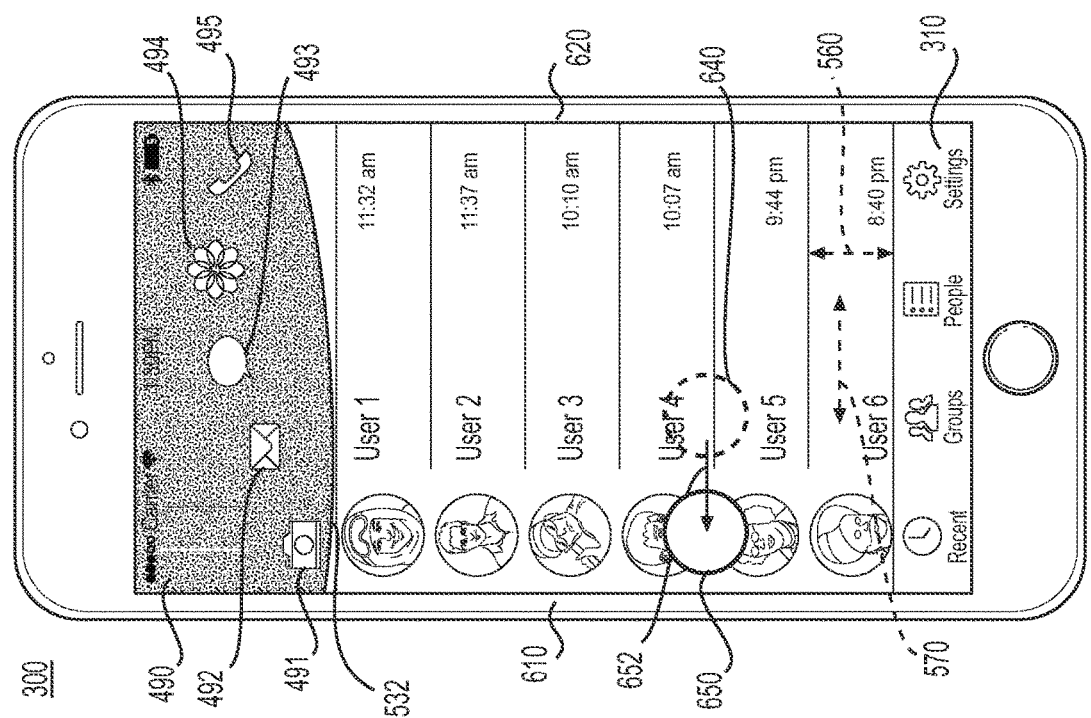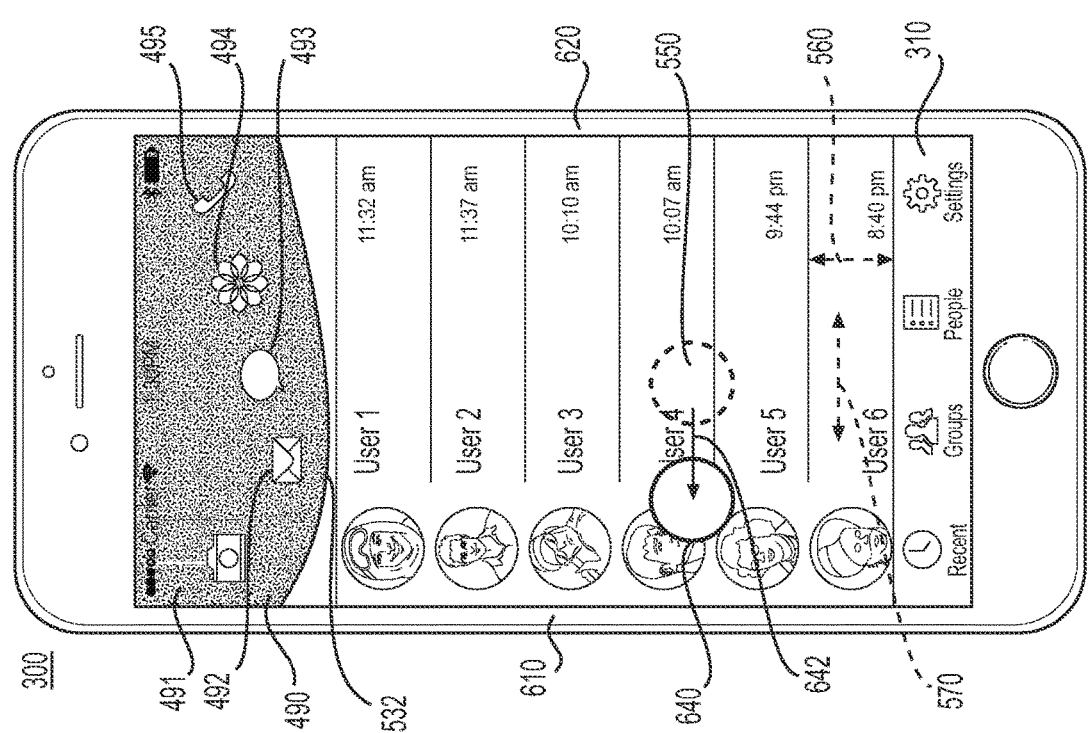

GRAVITY COMPOSER

TECHNICAL FIELD

This disclosure generally relates to user gestures for completing actions on a social-networking application UI.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a computing device may present a user interface (UI) of a first application (e.g., an application relating to social networking) on a screen of the computing device to be displayed to a user, and may detect a user input. For example, the detected user input may be an input tracing a multi-gesture continuous path on the screen of the computing device, and the path may include a first gesture extending from a first location to a second location on the screen followed by a second gesture extending from the second location to a third location on the screen, the second gesture being different from the first gesture. In response to detecting the first gesture, the computing device may display an interactive menu of the first application, the interactive menu comprising a plurality of objects corresponding to a plurality of menu options. In response to the detecting the second gesture, the computing device may identify one of the menu options, wherein the shape of the interactive menu changes based on the first gesture and the second gesture. In response to detecting user input indicating completion of the second gesture, the computing device may determine selection of the identified menu option.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 4A-4G illustrate an example UI of an opening of a drop-down menu on the mobile client system.

FIGS. 6A-6E illustrate an example UI of a user selection of a menu option from the drop-down menu on the mobile client system.

DESCRIPTION OF EXAMPLE EMBODIMENTS

Figure 1:
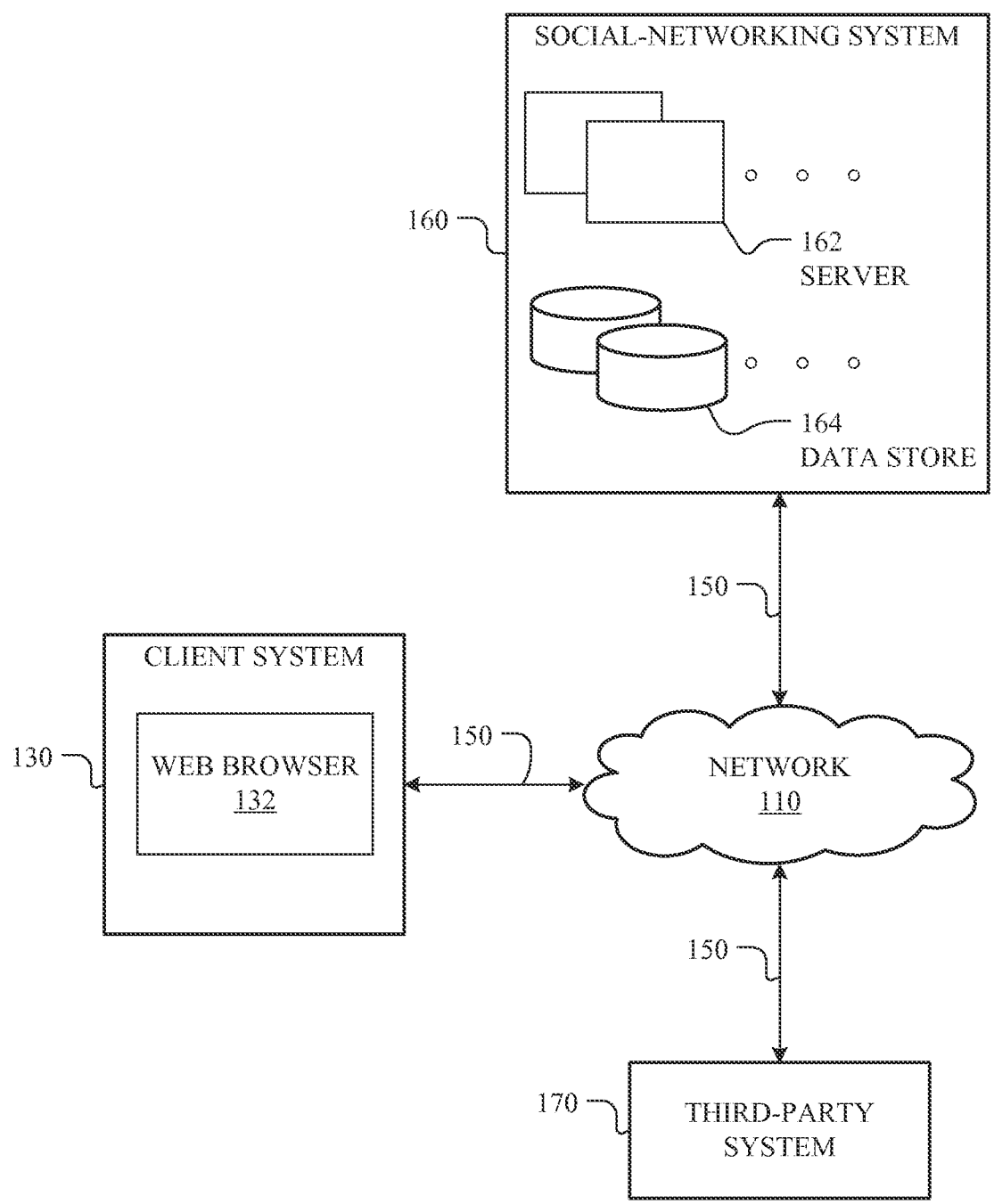
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
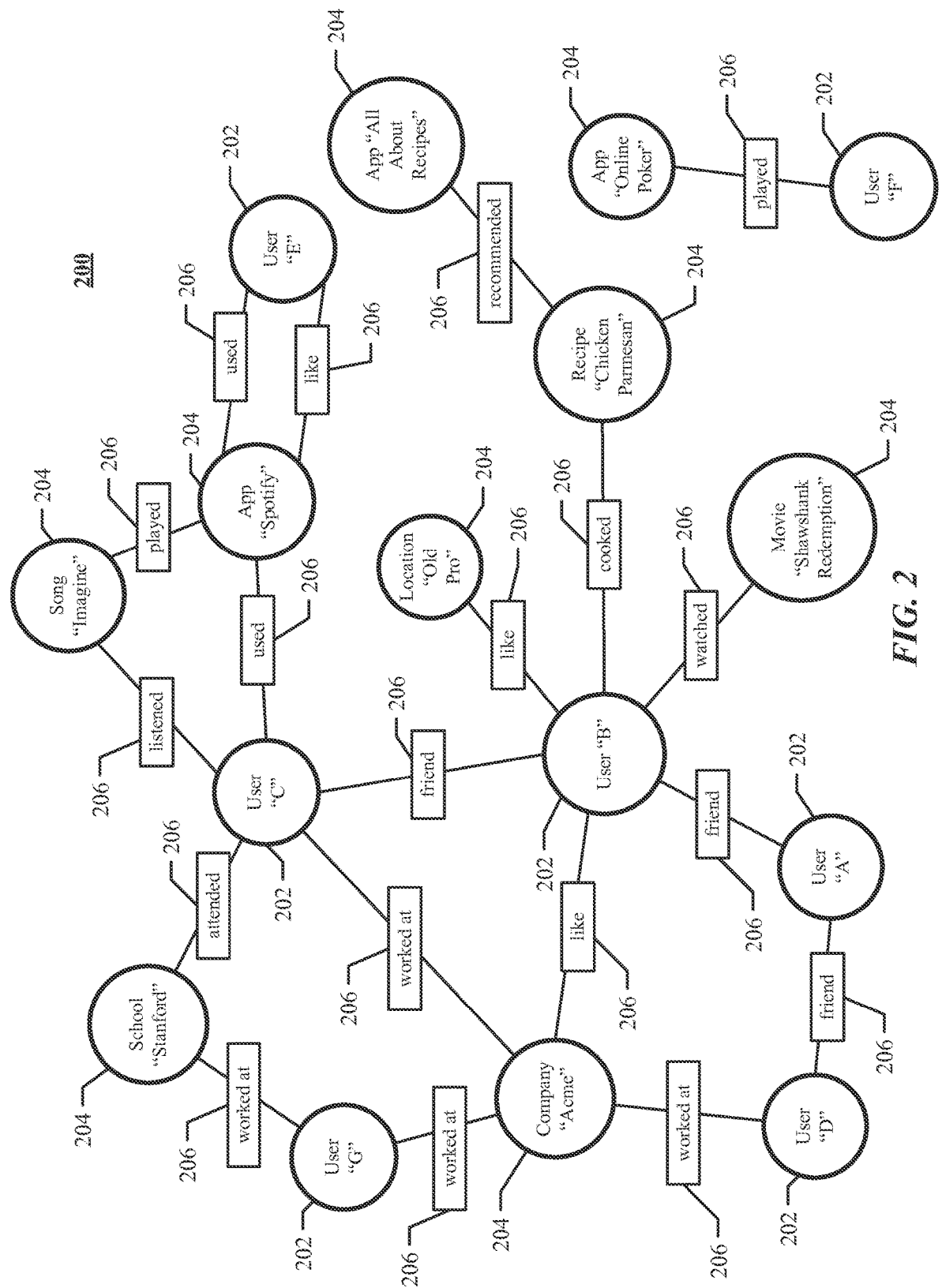
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 3:
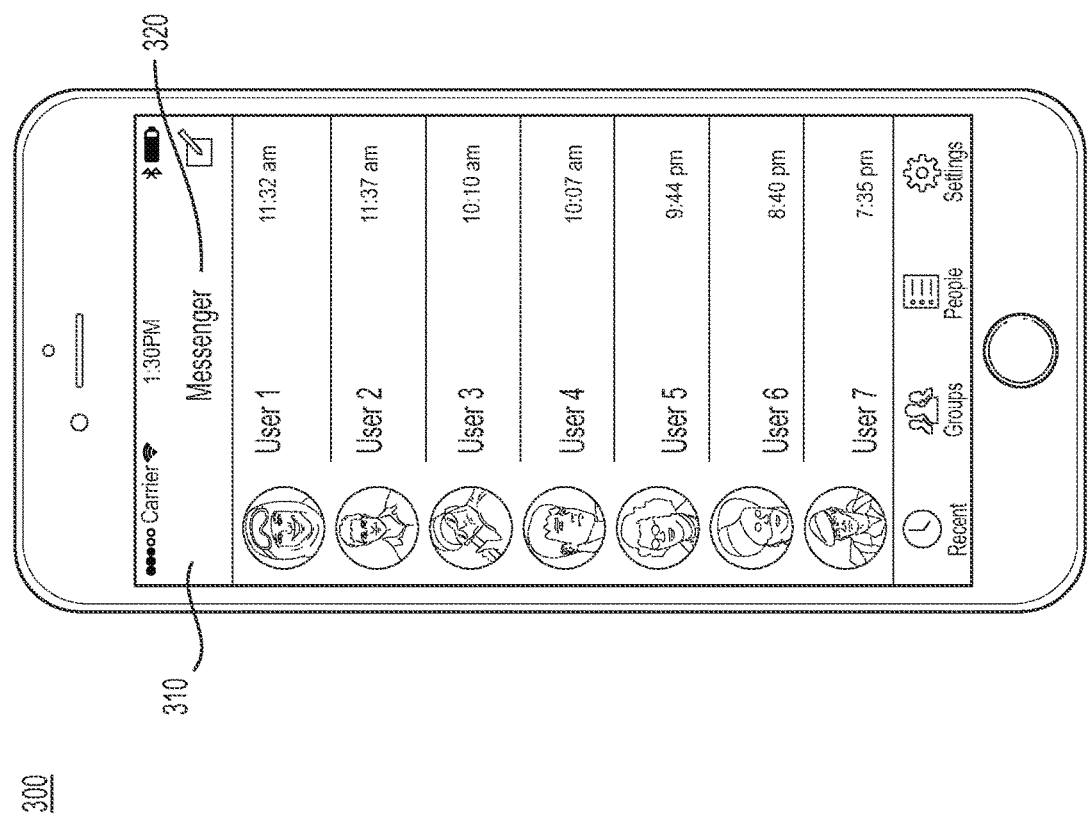
FIG. 3 illustrates an example UI display of a mobile client system.

FIG. 3 illustrates an example UI display of a mobile client system 300. In particular embodiments, a user may be presented with a UI of a first application 320 on a screen 310 of mobile client system 300. As shown in FIG. 3, this first application 320 may be a messenger application including a plurality of users that the user may chat with, and this messenger application may be connected with social-networking system 160.

In particular embodiments, this disclosure contemplates a sequence of user interactions with the UI of first application 320 on screen 310, and in particular, using sequences of continuous broad gestures that do not require a lot of precision in order to complete actions on the application UI of first application 320. For example, this application may allow users to open a second application different from first application 320 using a series of broad gestures using muscle memory while driving without having to look at their phone and make precise selections.

Figure 4A:
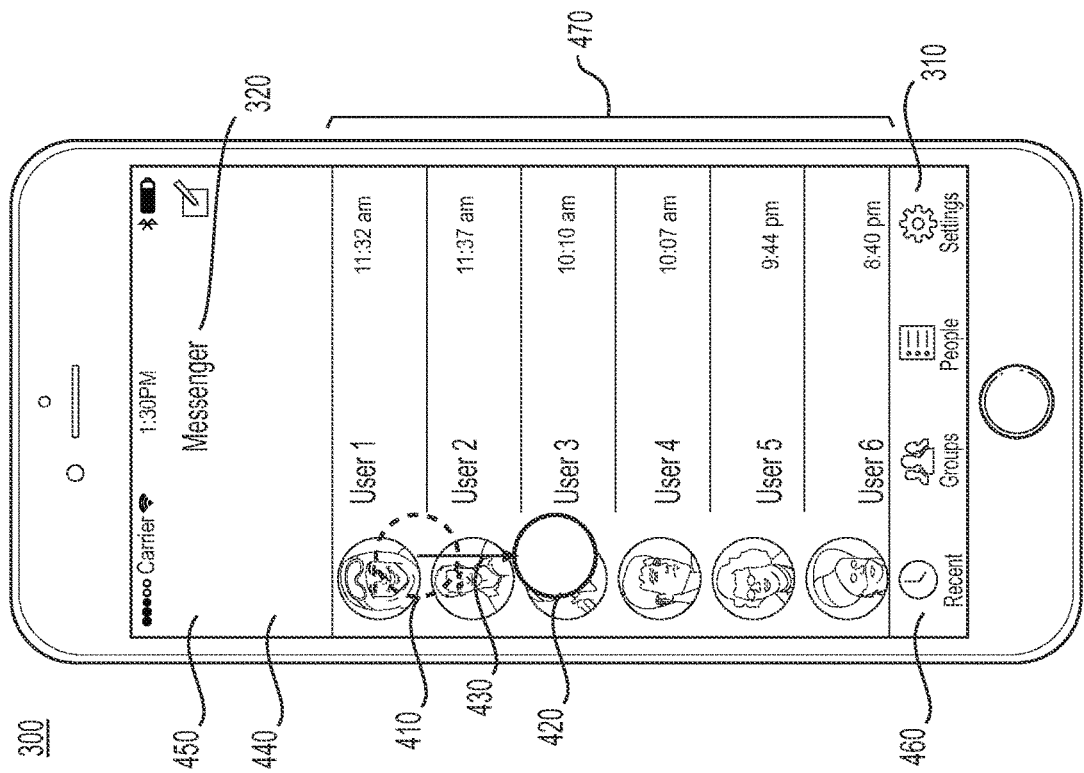
Figure 4G:
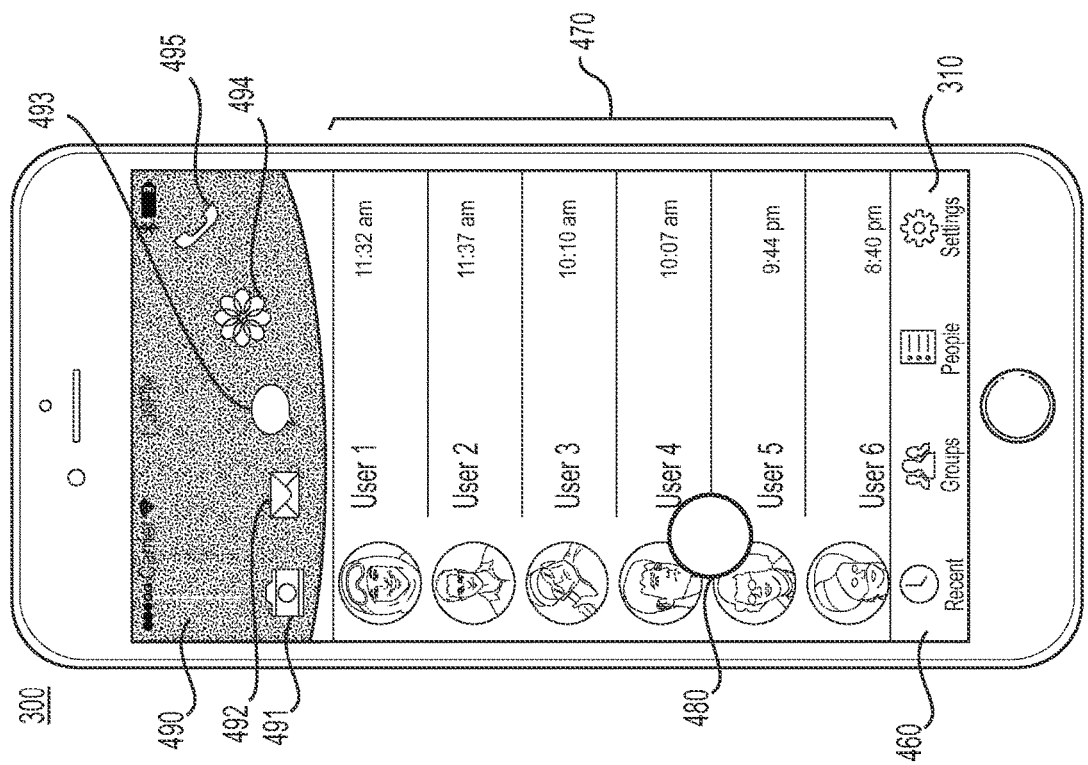
Figure 4F:
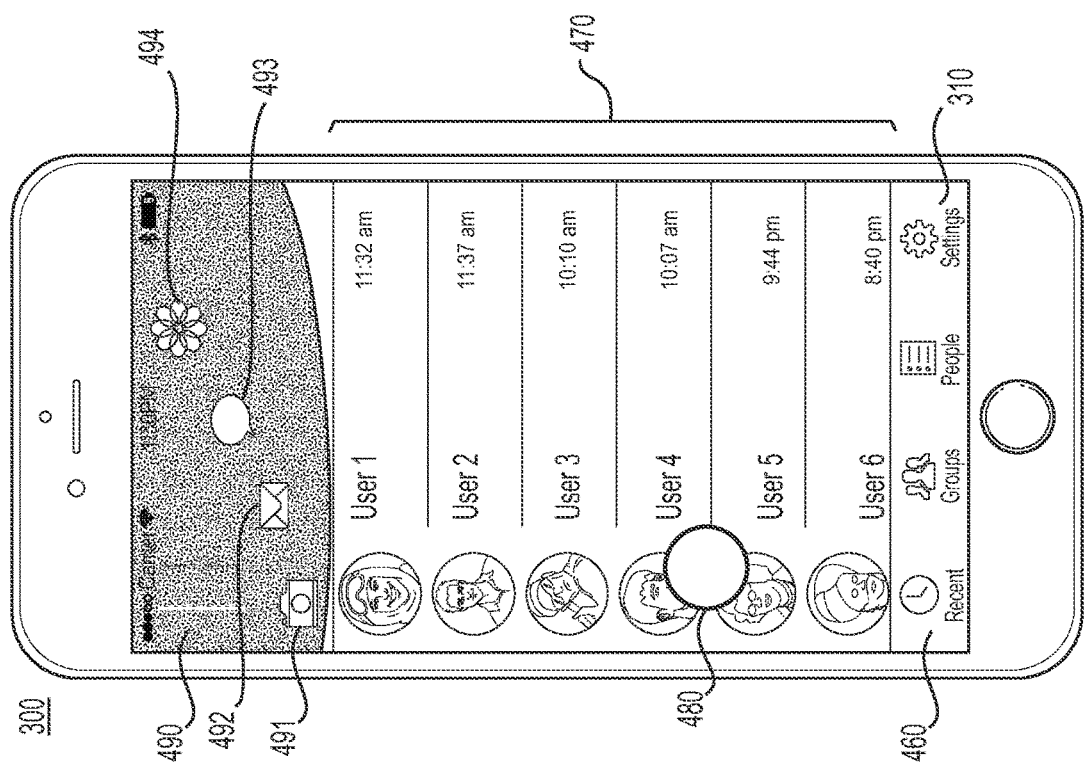

FIGS. 4A-4G illustrate an example UI of an opening of a drop-down menu on mobile client system 300 based on a sequence of user gestures. In particular embodiments, the user may interact with the UI by dragging a finger in a particular direction (e.g., in the vertical direction and toward the bottom of the device) to activate (e.g., by pulling down) a drop-down menu. As shown in FIG. 4A, the user may interact with the UI of first application 320 by using a finger to trace a multi-gesture continuous path from a first location 410 on screen 310 to an intermediate location 420 along a direction 430 (e.g., a vertical direction toward a bottom of mobile client system 300). In response to this user interaction, a space 440 at a top portion of first application 320 may be revealed by the movement of a portion 470 of the UI of first application 320 toward to the bottom of mobile client system 300 concurrently with the movement of the user's finger. Portion 470 may include the portion of first application 320 between a top title bar 450 (e.g., indicating that first application 320 corresponds to a messenger application) and a bottom application-specific menu bar 460 (e.g., including menu options associated with first application 320, such as "news feed," requests," "messages, and "notifications," as shown in FIG. 4A). As an example and not by way of limitation, portion 470 of first application 320 may include a list of other users in addition to photos of these user next to the user's name. In particular embodiments, some of the users on this list of other users may disappear off the UI when portion 470 is moved toward the bottom of mobile client system 300 to reveal space 440 above the list of users displayed in portion 470.

As shown in FIG. 4B, as the user continues to trace the continuous path from intermediate location 420 to a second location 480 along direction 430, in response to mobile client system 300 detecting the first gesture of the user tracing the continuous path from first location 420 to second location 480, an interactive menu (e.g., a drop-down menu) of first application 320 is displayed on screen 310, and this interactive menu may include a plurality of objects corresponding to a plurality of menu options. In particular embodiments, when drop-down menu 490 slides into view, drop-down menu 490 may overlap at least a portion of the UI of first application 320. As an example and not by way of limitation, a drop-down menu 490 may appear at a top portion of mobile client system 300 that overlaps space 440.

In particular embodiments, drop-down menu 490 may slide into view from a first side of screen 310 based on the first gesture such that the interactive menu extends in length in a first direction (e.g., direction 430). In particular embodiments, the first gesture may include a finger of the user moving in the first direction from first location 410 toward a second side of screen 310 toward second location 480, and drop-down menu 490 extending in length in first direction 430 comprises drop-down menu 490 extending toward the second side of screen 310. As an example and not by way of limitation, drop-down menu 490 may appear on screen 310 as if being "pulled down" on the UI to cover space 440 by the user tracing the continuous path from intermediate location 420 to second location 480. In particular embodiments, the shape of drop-down menu 490 extends in first direction 430 to a predetermined maximum length, as shown in FIG. 4C. Alternatively or in combination with the "pulling down" of drop-down menu 490, as an example and not by way of limitation, drop-down menu 490 may appear on screen 310 as if materializing in position overlapping space 440 as the user is tracing the continuous path from intermediate location 420 to second location 480. In particular embodiments, drop-down menu 490 may be displayed to be a different color from the background (e.g., a blue-colored drop-down menu on a white background, a red-colored drop-down menu on a white background, a yellow-colored drop-down menu on a black background, etc.).

In particular embodiments, drop-down menu 490 may present, for example, a number of options of applications for selection by the user (e.g., a camera app, an email app, a messenger app, a photo application, a phone application, a web browser application, etc.). As shown in FIGS. 4B and 4C, after drop-down menu 490 is displayed in its entirety on the UI of mobile client system 300, one or more other application icons 491, 492, 493, 494, 495 may start to appear in drop-down menu 490. In particular embodiments, drop-down menu 490 may include movement exhibiting gravity-like effects as drop-down menu 490 is pulled down. In particular embodiments, these one or more other application icons 491, 492, 493, 494, 495 may appear one by one, and may appear by an animation of the application icon "dropping" (e.g., by gravity-like effects) into a location on drop-down menu 490 associated with each application. As an example and not by way of limitation, the one or more other application icons 491, 492, 493, 494, 495 may be displayed in a row across the top of screen 310, and thus the one or more other application icons 491, 492, 493, 494, 495 may "drop" into their positions one by one on drop-down menu 490, as shown in FIGS. 4C-4G.

In particular embodiments, drop-down menu 490 may be displayed using an amorphous shape (e.g., two conjoined semicircles), and this shape may be interactive in movement and/or shape. As an example and not by way of limitation, the shape of drop-down menu 490 may change as the user is pulling down the drop-down menu. As an example and not by way of limitation, the shape of drop-down menu 490 may widen and/or become more circular in the vertical direction as drop-down menu 490 appears on the UI as a result of the user tracing a continuous path from first location 420 to second location 480, as shown in FIGS. 4B and 4C.

Figure 5:
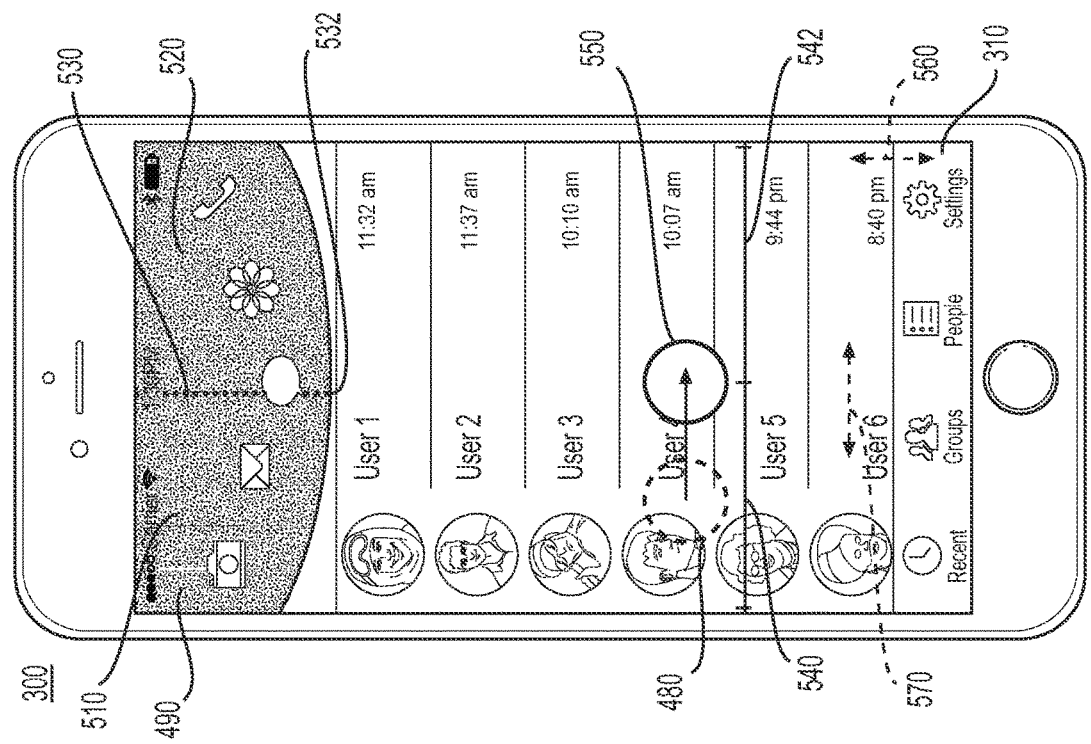
FIG. 5 illustrates an example configuration of the UI of the drop-down menu.

In particular embodiments, in response to mobile client system 300 detecting the second gesture, mobile client system 300 may identify the selection of one of the menu options. In particular embodiments, a shape of drop-down menu 490 may change based on the first gesture and the second gesture. As an example and not by way of limitation, when the user is moving his/her finger based on the second gesture, a lowest point of drop-down menu 490 may follow the finger's position on the UI to move from one position to another position (e.g., to correspond to moving from one application to another application) along the menu to provide a visual representation of which application is being selected. This visual representation of the drop-down menu 490 is explained in more detail with reference to FIG. 5. In particular embodiments, the shape of drop-down menu 490 includes a composite shape created by joining two or more geometric shapes along one or more medians. As an example and not by way of limitation, a median may be a connecting point or line between two composite shapes where the shapes are touching each other at the connecting point or along the connecting line. As shown in FIG. 5, in particular embodiments, drop-down menu 490 may be built by fusing two semicircular shapes 510, 520 together at a median point 530, which also corresponds to a lowest point 532 of drop-down menu 490, to create a circular-shaped drop-down menu 490. As an example and not by way of limitation, each of the two or more geometric shapes may include a circular shape, a triangular shape, a rectangular shape, a square shape, or a polygonal shape comprising more than four line segments. As an example and not by way of limitation, when drop-down menu 490 comprises more than two geometric shapes, each of two adjacent geometric shapes may be connected at a median. In particular embodiments, there may be more than one median where drop-down menu 490 comprises more than two geometric shapes.

In particular embodiments, when the user is moving his/her finger based on the second gesture, circular-shaped drop-down menu 490 may change the shapes of both semicircles 510, 520. In particular embodiments, the shapes of semicircles 510, 520 change in an inversely correlated fashion based on a change in a width 540 of semicircle 510, and a corresponding change in a width 542 of semicircle 520 by correlating the point of fusion (e.g., median point 530) of the two semicircles 510, 520 (which is also the lowest point 532 of the overall circular shape of drop-down menu 490) with the position of the user's finger on the UI (e.g., along a vertical axis 560). In particular embodiments, lowest point 532 of drop-down menu 490 follows a position 550 of the user's finger as the user's finger moves along second direction 570. In particular embodiments, a shape of drop-down menu 490 may deform based on the second gesture such that a position of median 530 along the second direction corresponds to a current position of the detected user input during the second gesture, a width of a first subset of the geometric shapes of drop-down menu 490 decreases or increases based on the movement of the finger, and a width a second subset of the geometric shapes conversely increases or decreases based on the width of the first subset of geometric shapes. The first subset of geometric shapes may include one geometric shape (e.g., one semicircle 510) and the second subset of geometric shapes may include one geometric shape (e.g., one semicircle 520).

FIGS. 6A-6E illustrate an example UI of a user selection of a menu option from a plurality of menu options 491, 492, 493, 494, 495 displayed on drop-down menu 490 on mobile client system 300. For example, menu option 491 may correspond to a photography application (e.g., as exemplified by the camera menu option display icon), menu option 492 may correspond to an email application (e.g., as exemplified by the envelope menu option display icon), menu option 493 may correspond to a messenger application such as a separate messenger not related to social networking system 160 (e.g., as exemplified by the speech bubble menu option display icon), menu option 494 may correspond to an image-viewing application (e.g., as exemplified by the flower-shaped menu option display icon), and menu option 495 may correspond to a phone application for making phone calls (e.g., as exemplified by the telephone receiver menu option display icon).

In particular embodiments, in order for the user to select to go to one of the applications corresponding to application icons 491, 492, 493, 494, 495, the user may not lift his/her finger after pulling down drop-down menu 490, and instead may follow the first gesture from first location 420 to second location 480 with a second gesture of tracing the continuous path from second location 480 to a third location 550, as discussed above with regard to FIGS. 4A, 4B, and 5. In particular embodiments, the user input tracing the continuous path includes the first gesture followed by the second gesture, the second gesture being different from the first gesture. As discussed above, the first gesture may include the finger of the user moving in the first direction 430 from first location 420 toward second location 480, and as a result, drop-down menu 490 also extending in length in first direction 430. As an example and not by way of limitation, the second gesture may include the finger of the user moving in a second direction 570 (e.g., a horizontal axis) that is substantially perpendicular to first direction 430 from second location 480 to third location 550. As an example and not by way of limitation, the user may move his/her finger in a left direction or a right direction relative to the bottom of mobile client system 300 to make an application selection.

In particular embodiments, when the user is moving his/her finger based on the second gesture, the user may move his/her finger along second direction 570 to the right (e.g., toward a side 610 of screen 310), to the left (e.g., toward a side 620 of screen 310), or a combination thereof. As an example and not by way of limitation, when the user moves his/her finger along second direction 570 toward side 610, lowest point 532 of drop-down menu 490 follows position 550 of the user's finger as the user's finger moves along second direction 570. In particular embodiments, a menu option that corresponds to a location of lowest point 532 also "drops down" (e.g., appears to be "pulled" closer toward a bottom of drop-down menu 490 than any of the other menu options). In particular embodiments, a menu option that corresponds to a location of lowest point 532 (i.e., a menu option is being selected by the user) may also highlighted in some fashion, such as by changing a color of the menu option, a background color of the menu option, a highlighting of the outline of the icon for the menu option, and/or other suitable changes. As an example and not by way of limitation, as shown in FIG. 6A, in performing the second gesture, as the user's finger moves along second direction 570 from position 550 toward side 610 to a position 640 (e.g., along a path of arrow 642), lowest point 532 corresponds to position 640 that moves to a position that aligns along vertical axis 560 with the position of menu option 492 (i.e., corresponding to the email application) on drop-down menu 490. Then, as shown in FIG. 6B, in performing the second gesture, as the user's finger moves further along second direction 570 from position 640 even closer toward side 610 to position 650 (e.g., along a path of arrow 652), lowest point 532 corresponds to a position 650 that moves to a position that aligns along vertical axis 560 with the position of menu option 491 (i.e., corresponding to the photography application) on drop-down menu 490.

Figure 6C:
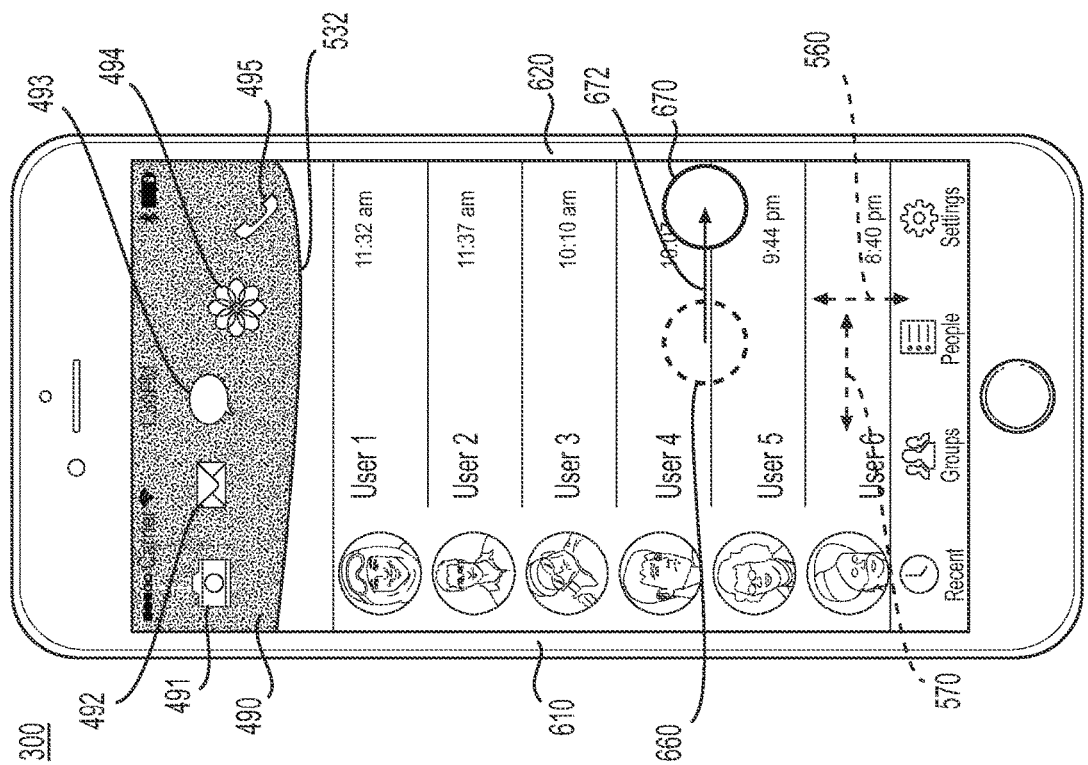
Figure 6D:
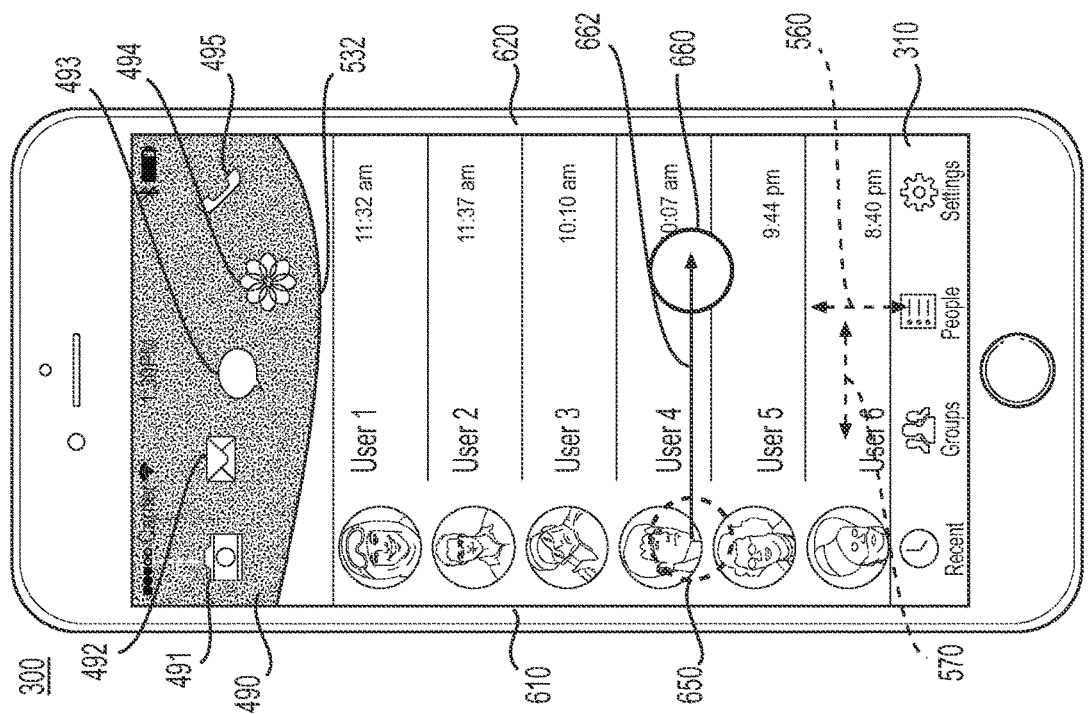
Figure 6E:
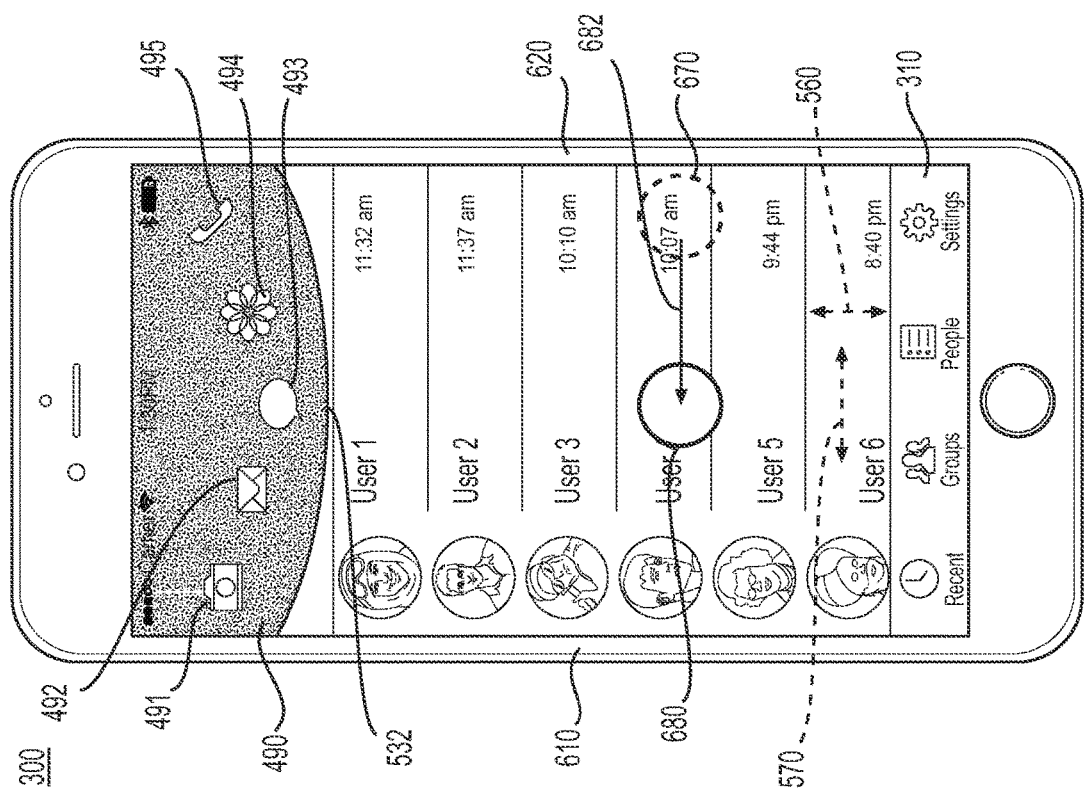

In particular embodiments, as shown in FIG. 6C, in performing the second gesture, as the user's finger moves along direction 570 from position 650 toward side 620 (i.e., opposite side 610) to position 660 (e.g., along a path of arrow 662), lowest point 532 corresponds to a position 660 that moves to a position that aligns along vertical axis 560 with the position of menu option 494 (i.e., corresponding to the image-viewing application) on drop-down menu 490. Then, as shown in FIG. 6D, in performing the second gesture, as the user's finger moves further along second direction 570 from position 660 even closer toward side 620 to a position 670 (e.g., along a path of arrow 672), lowest point 532 corresponds to a position 670 that moves to a position that aligns along vertical axis 560 with the position of menu option 495 (i.e., corresponding to phone application) on drop-down menu 490. In particular embodiments, as shown in FIG. 6E, when the user's finger moves from position 670 to a position 680 (e.g., along a path of arrow 682), where position 680 is substantially equidistant from side 610 and side 620, in performing the second gesture, lowest point 532 corresponds to a position 680 that moves to a position that aligns along vertical axis 560 with the position of menu option 493 (i.e., corresponding to the messenger application) on drop-down menu 490.

FIGS. 7A-7E illustrate an example UI of a closing of the drop-down menu on the mobile client system. In particular embodiments, in response to detecting user input indicating completion of the second gesture, mobile client system 300 may determine that the user has selected an identified menu option of the plurality of menu options 491, 492, 493, 494, 495 displayed on drop-down menu 490. In particular embodiments, the user input indicating completion of the second gesture may correspond to a user input indicating completion of the continuous path. As an example and not by way of limitation, after the user has selected a menu option of the plurality of menu options 491, 492, 493, 494, 495 by way of the second gesture, user input indicating completion of the second gesture may include the user lifting up his/her finger off screen 310 of mobile client system 300. In this situation, mobile client system 300 may detect that the user has lifted his/her finger off screen 310 of mobile client system 300, and based on this detection may determine that there is completion of the second gesture.

In particular embodiments, the user input indicating completion of the second gesture may correspond to a user input indicating a long hold at the third location. As an example and not by way of limitation, after the user has selected a menu option of the plurality of menu options 491, 492, 493, 494, 495 by way of the second gesture, user input indicating completion of the second gesture may include the user holding his/her finger at the third location for a predetermined amount of time (e.g., an amount of time sufficient to differentiate from a user simply holding his/her finger temporarily at a position on screen 310 while making a determination of which menu option to select. In this situation, mobile client system 300 may detect that the user has held his/her finger on screen 310 of mobile client system 300 for the predetermine amount of time, and based on this detection may determine that there is completion of the second gesture. As an example and not by way of limitation, user input may be provided to navigate through multi-tiered menus such that a long hold may open a new menu level and/or a new window of drop-down menu 490. In particular embodiments, an implementation with multi-tiered menus may include a user input comprising more than two gestures along a continuous path in order to handle the interaction with the multi-tiered menu UI.

Figure 7A:
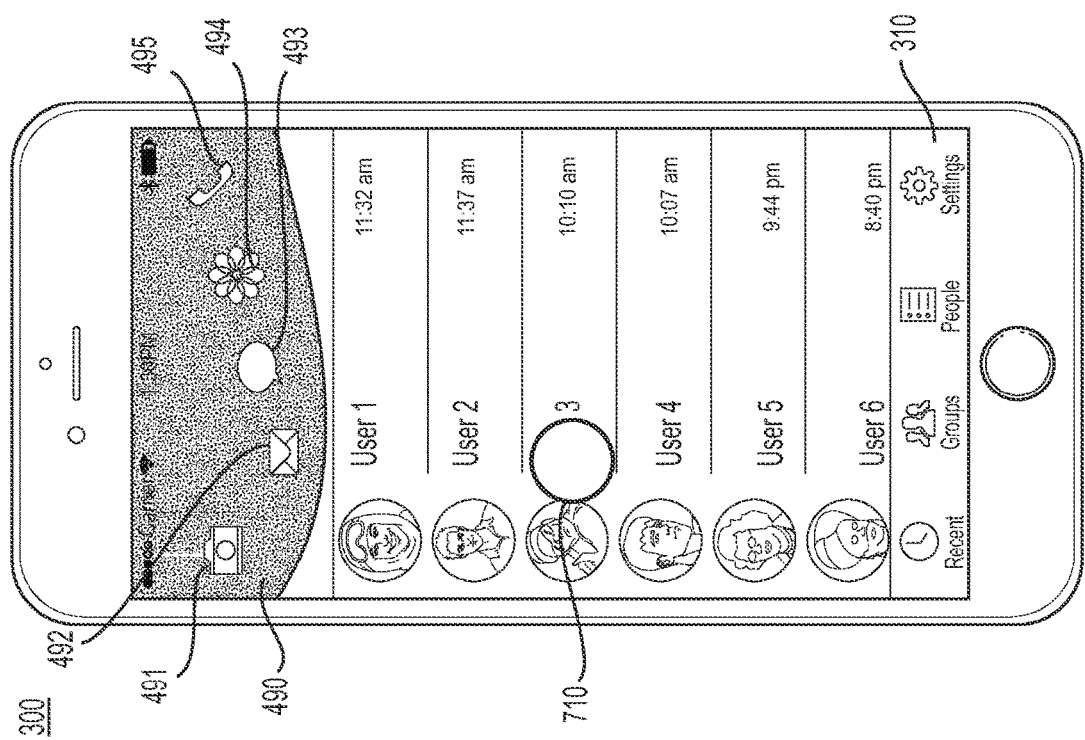
FIGS. 7A-7E illustrate an example UI of a closing of the drop-down menu on the mobile client system.
Figure 7C:
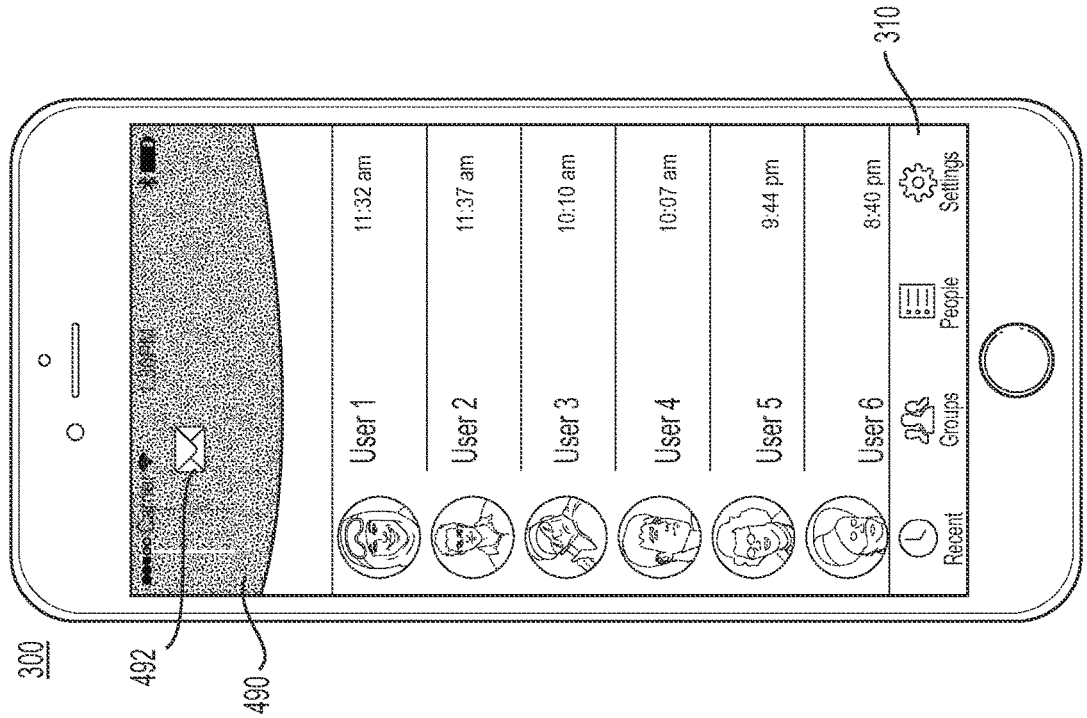
Figure 7B:
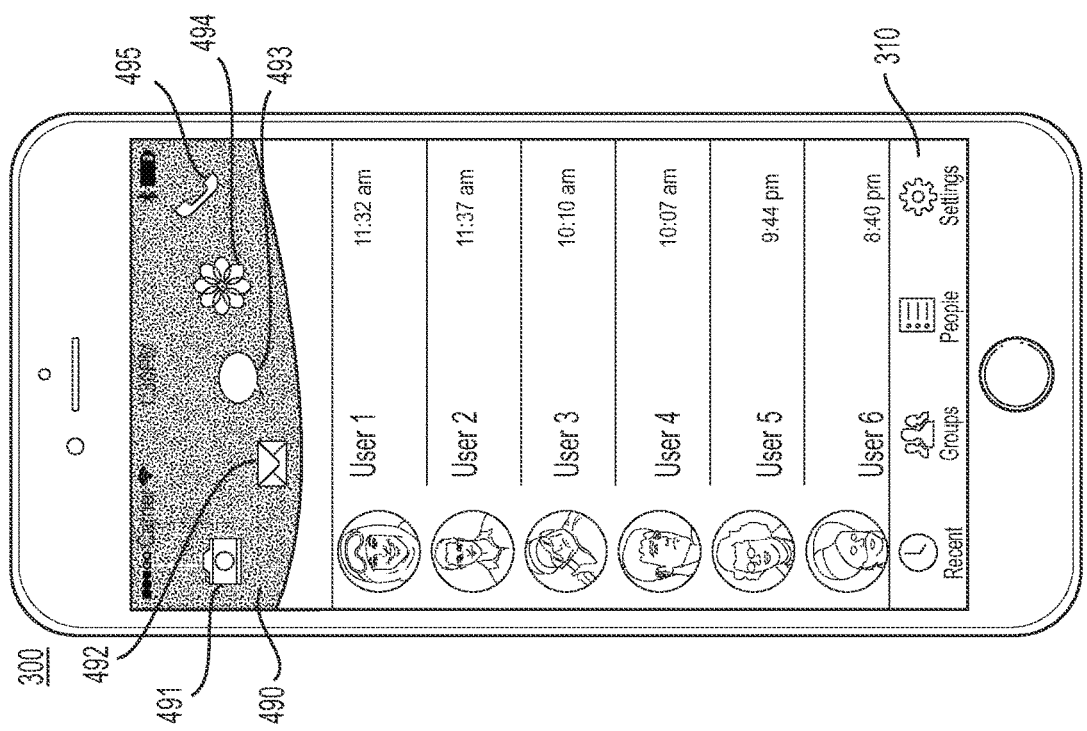
Figure 7E:
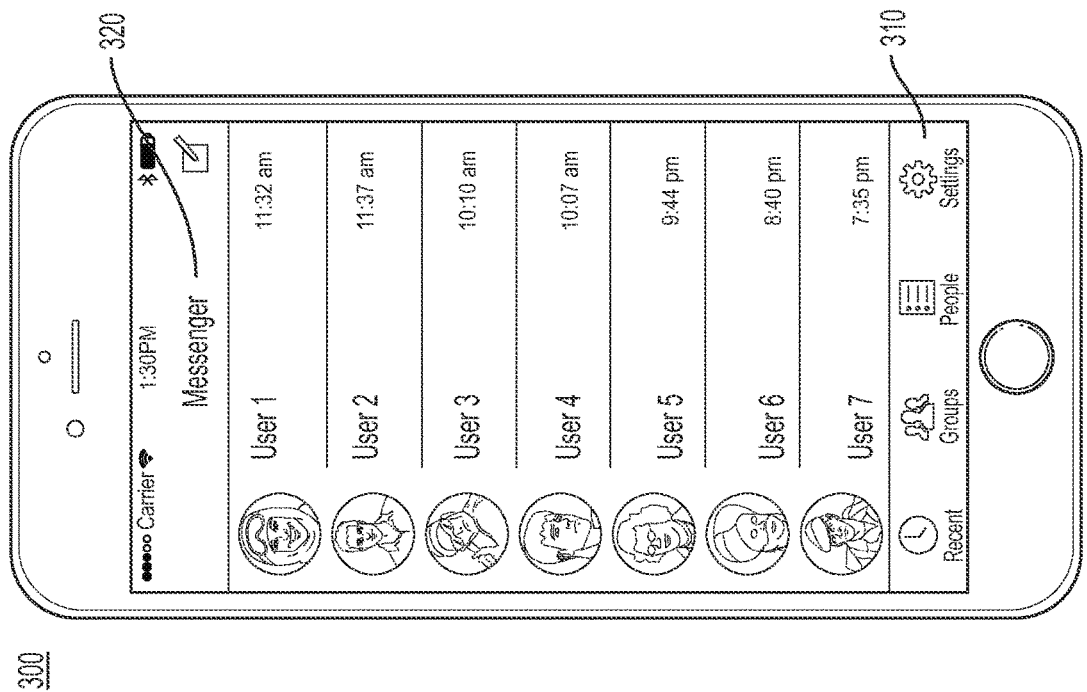
Figure 7D:
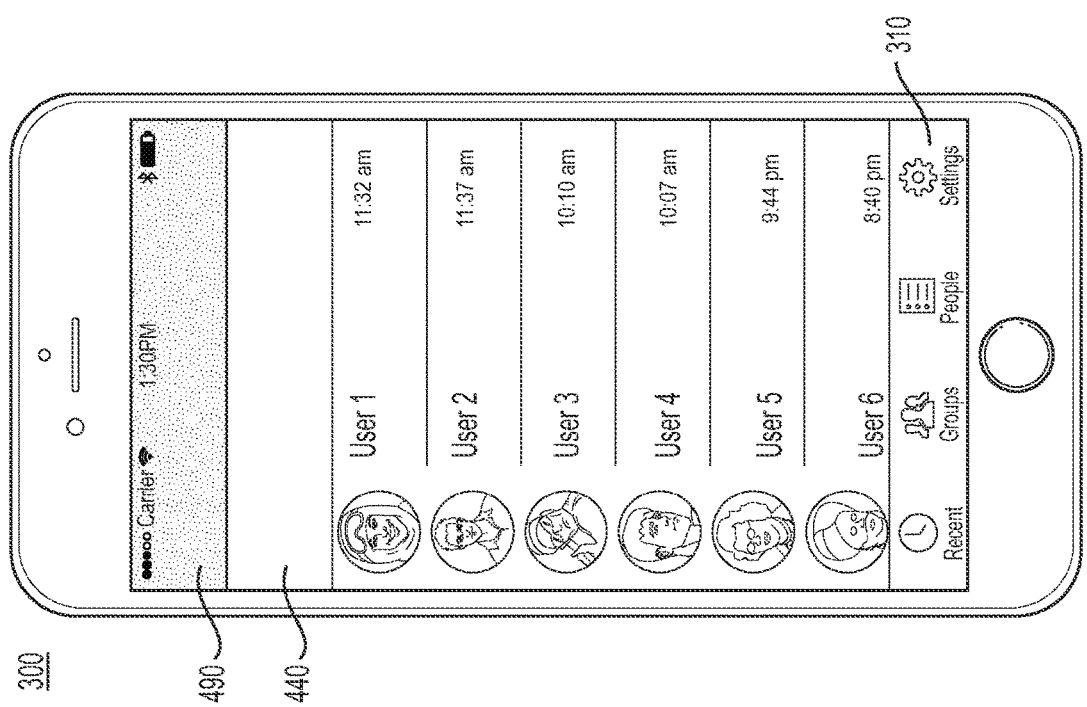

In particular embodiments, upon detecting the user input indicating completion of the continuous path of the first gesture followed by the second gesture, the interactive menu may disappear. As shown in FIG. 7A, a user input 610 on screen 310 indicates completion of the second gesture and selection of menu option 492 of drop-down menu 490. As discussed above, this user input may include either the user removing his/her finger from screen 310 or performing a long hold. Once mobile client system 300 determines that user input 610 indicates completion of the second gesture, drop-down menu 490 may disappear off screen 310 by sliding out of view toward the top of screen 310, as shown in FIGS. 7B-7D. In particular, as menu options 491, 492, 493, 494, 495 slide out of view with drop-down menu 490, the selected menu option (e.g., menu option 492 in FIG. 7C), may be the last menu option to slide out of view on screen 310. Then, as shown in FIGS. 7D and 7E, as drop-down menu 490 slides completely out of view, space 440 is revealed, and then portion 470 slides back over space 440 to cover space 440 and transition the UI back to the UI of the first application 320.

In particular embodiments, upon detecting the user input indicating completion of the continuous path of the first gesture followed by the second gesture, another window of the interactive menu may appear. As an example and not by way of limitation, user input may be provided to navigate through multi-tiered menus such that the completion of the continuous path may open a new menu level and/or a new window of drop-down menu 490. This new menu level may be displayed on the same menu level as drop-down menu 490, or may be displayed as a new window on a different menu level as drop-down menu 490. In particular embodiments, this new window may cover at least a portion of drop-down menu 490.

Figure 8:
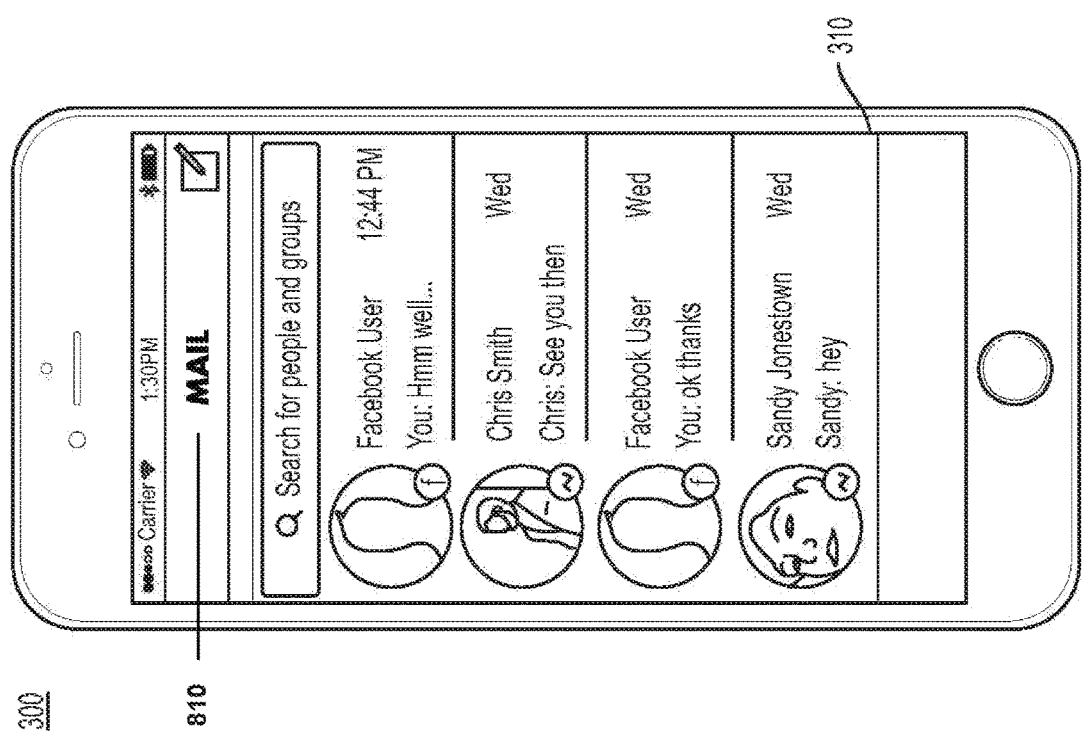
FIG. 8 illustrates an example UI of an application UI following the user selection of the menu option from the drop-down menu on the mobile client system.

In particular embodiments, after mobile client system 300 determines that the user has selected the identified menu option and drop-down menu 490 has disappeared, mobile client system 300 may transition from the UI of first application 320 on screen 310 (as shown in FIG. 3) to a UI of a second application 810 (e.g., an email application), as shown in FIG. 8. As discussed above with regard to FIG. 7A, user input 610 on screen 310 indicates completion of the second gesture and selection of menu option 492 of drop-down menu 490, where menu option 492 corresponds to the email application. Once mobile client system 300 determines that menu option 492 is selected and drop-down menu 490 disappears, mobile client system 300 may transition the UI to the UI associated with second application 810 (i.e., the email application of menu option 492). This then allows the user to interact with the email application, e.g., by composing an email using second application 810.

In particular embodiments, the user may decide to remain in the UI of first application 320 by closing drop-down menu 490 without making a selection of a menu option. As an example and not by way of limitation, the user may move his/her finger toward the top portion of screen 310 to close drop-down menu 490 without making a selection of a menu option. In response, mobile client system 300 may close drop-down menu 490 in the same fashion as discuss above with regard to FIGS. 7A-7E. As an example and not by way of limitation, drop-down menu 490 may be closed by slowly sliding and/or shrinking back into the top portion of screen 310, for example, based on the movement of the user's finger sliding toward the top portion of screen 310. After closing drop-down menu 490, mobile client system 300 will remain in the UI of first application 320 (i.e., mobile client system 300 will not transition the UI to the UI associated with second application 810, as discussed above).

In accepting user input on the UI, there may a degree of tolerance for error with respect to the user input and movement. As an example and not by way of limitation, when the user is initially activating drop-down menu 490, the user's finger movement need not move in a perfectly vertical direction (e.g., along vertical axis 560 as shown in FIG. 6A), and may have a threshold of error up to a predetermined vertical distance. As another example and not by way of limitation, the user's finger movement may have a threshold of error up to a predetermined angle (e.g., up to 45 degrees from vertical axis 560). In addition, as an example and not by way of limitation, when the user is selecting an app from the drop-down menu, the user's finger movement need not move in a perfectly horizontal direction (e.g., along horizontal axis 570), and may have a threshold of error up a predetermined vertical distance. As another example and not by way of limitation, the user's finger movement may have a threshold of error up to a predetermined angle (e.g., up to 22.5 degrees from horizontal axis 570).

In particular embodiments, the drop-down menu may be located and "pulled down" from any side of a UI (e.g., from the bottom, or from left side 610 or right side 650, as shown in FIG. 6A). In particular embodiments, the UI may accept a variety of different user gestures to activate the menu or select an app (e.g., a circular gesture). As an example and not by way of limitation, the first gesture may include a finger of the user moving in a circular direction starting from the first location and ending at the second location on the screen. In particular embodiments, the first gesture and/or the second gesture may include a multi-touch gesture. As an example and not by way of limitation, multi-touch gestures may include multi-finger inputs (e.g., two or more fingers moving together for the gesture) and other suitable multi-touch gestures. In particular embodiments, the UI may accept multi-finger inputs to differentiate one gesture from another gesture (e.g., to differentiate a gesture to move through a list of items on a currently-displayed app vs. a gesture to initiate the drop-down menu). In particular embodiments, the UI may be able to accept and process multi-faceted user inputs, including inputs with secondary information such as pressure, speed, and other suitable parameters.

In particular embodiments, the user interaction may require a first gesture along a first axis (e.g., vertical axis 560), which is then followed by a second gesture along a second axis (e.g., horizontal axis 570), wherein the gestures are connected by the user's finger remaining on the screen of the device during the entirety of the gestures. In particular embodiments, this user interaction may be extended to situations that do not require physical feedback on screen 310, such as 2D or 3D implementations. In these situations, for example, a gesture-detection device may detect user gestures on a 2D plane or 3D space to first activate a menu (e.g., drop-down menu 490) and then a select an application from among a selection of menu options (e.g., menu options 491, 492, 493, 494, 495). As an example and not by way of limitation, these embodiments may be useful in situations such as a heads-up display in a car, a tv menu/channel selection application that accepts 3D inputs, and other suitable situations.

Figure 9:
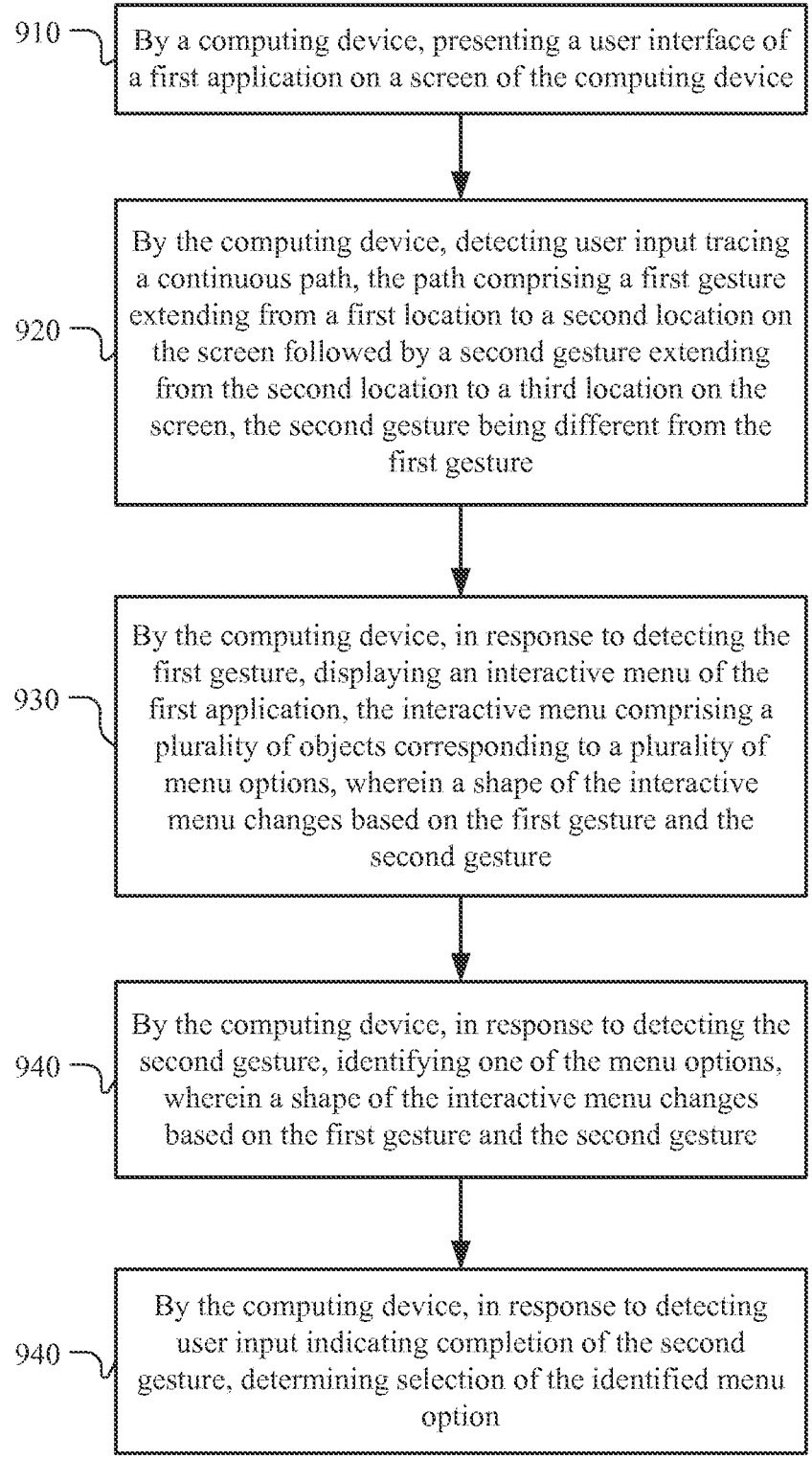
FIG. 9 illustrates an example method for selecting a menu option from the UI of the drop-down menu on the mobile client system.

FIG. 9 illustrates an example method 900 for using one or more sequences of continuous broad gestures in order to complete actions on an application UI. The method may begin at step 910, where a UI of a first application is presented on a screen of mobile client system 300. At step 920, using input tracing a continuous path may be detected, and the path may comprise a first gesture extending from a first location to a second location on the screen followed by a second gesture extending from the second location to a third location on the screen. In particular embodiments, the second gesture may be different from the first gesture. At step 930, in response to detecting the first gesture, an interactive menu of the first application may be displayed, the interactive menu comprising a plurality of objects corresponding to a plurality of menu options. At step 940, in response to detecting the second gesture, the menu options may be identified, wherein a shape of the interactive menu may change based on the first gesture and the second gesture. Then, at step 950, in response to detecting using input indicating completion of the second gesture, the selection of the identified menu option may be determined. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for using one or more sequences of continuous broad gestures in order to complete actions on an application UI including the particular steps of the method of FIG. 9, this disclosure contemplates any suitable method for using one or more sequences of continuous broad gestures in order to complete actions on an application UI including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
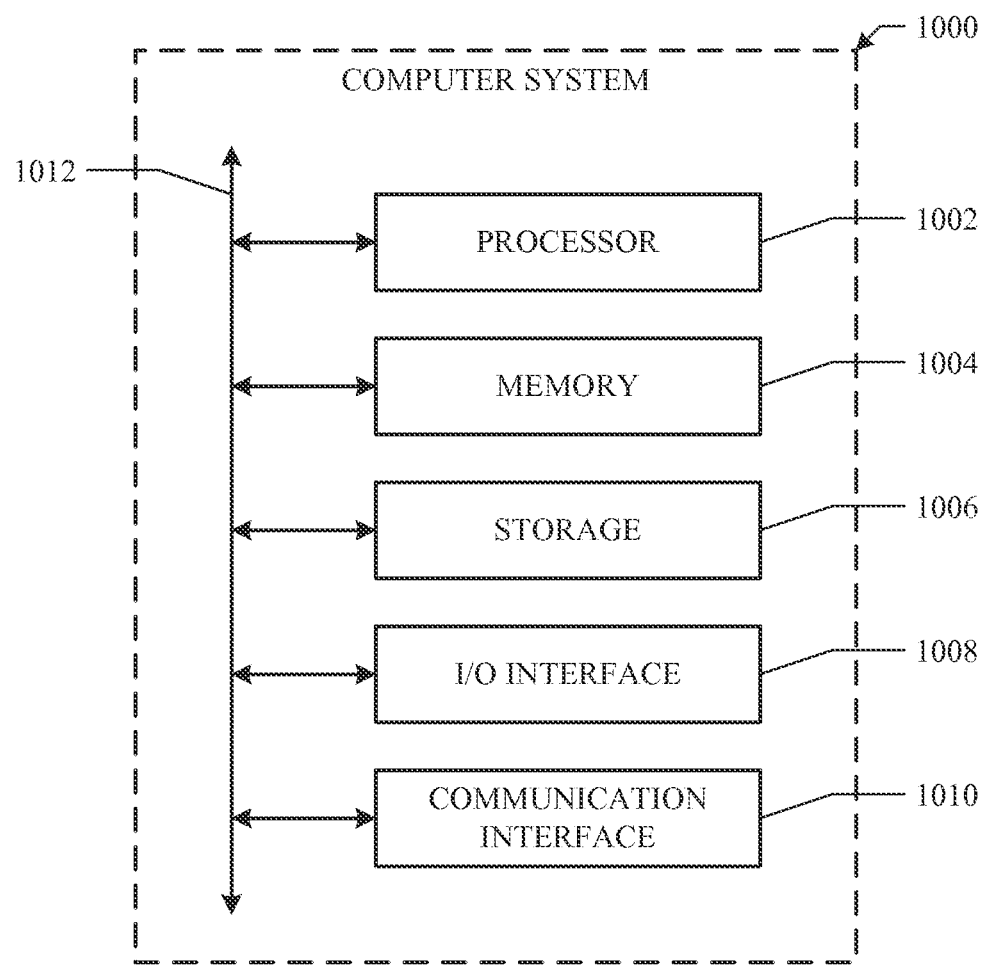
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
   presenting a user interface (UI) of a first application on a screen of the computing device;
   detecting user input tracing a continuous path, the path comprising a first gesture extending from a first location to a second location on the screen followed by a second gesture extending from the second location to a third location on the screen, the second gesture being different from the first gesture;
   displaying, responsive to detecting the first gesture, an interactive menu of the first application at a fourth location different from the first, second, and third locations, the interactive menu comprising a plurality of objects corresponding to a plurality of menu options, respectively, wherein the plurality of objects are aligned along a plurality of respective horizontal positions across the screen, wherein each of the plurality of objects moves into view at its respective horizontal position, one by one, from a top of the screen toward a bottom of the screen into a respective vertical position on the interactive menu while maintaining its respective horizontal position, and wherein a shape of the interactive menu changes based on the first gesture and the second gesture;
   identifying, responsive to detecting the second gesture, one of the menu options, wherein a shape of the interactive menu located at the fourth location changes based on the first gesture and the second gesture, wherein the change of the shape of the interactive menu comprises at least a deformation of a bottom portion of the interactive menu corresponding to the third location, and wherein the object corresponding to the identified menu option moves from a first vertical position toward the bottom of the screen into a second vertical position on the interactive menu while maintaining its respective horizontal position; and
   determining, responsive to detecting user input indicating completion of the second gesture, selection of the identified menu option.

2. The method of claim 1, wherein the interactive menu slides into view from a first side of the screen based on the first gesture such that the interactive menu extends in length in a first direction.

3. The method of claim 2, wherein when the interactive menu slides into view, the interactive menu overlaps at least a portion of the UI of the first application.

4. The method of claim 2, wherein the change of shape of the interactive menu further comprises an extension of the bottom portion of the interactive menu corresponding to the third location, and
   wherein the first gesture comprises a finger of the user moving in the first direction toward a second side of the screen, and
   wherein the interactive menu extending in length in the first direction comprises the interactive menu extending toward the second side of the screen.

5. The method of claim 4, wherein the shape of the interactive menu extends in the first direction to a predetermined maximum length.

6. The method of claim 2, wherein the shape of the interactive menu comprises a composite shape created by joining two or more geometric shapes along one or more medians.

7. The method of claim 6, wherein one of each of the two or more geometric shapes comprises a circular shape, a triangular shape, a rectangular shape, a square shape, or a polygonal shape comprising more than four line segments.

8. The method of claim 6,
   wherein the second gesture comprises the finger of the user moving along a first second direction toward a first third side of the screen, a second fourth side of the screen, or a combination thereof; and
   wherein the deformation of the bottom portion of the interactive menu is based on the second gesture such that
      a position of one of the one or more medians along with respect to an axis orthogonal to the first second direction corresponds to a current position of the detected user input during the second gesture,
      a width of a first subset of the geometric shapes of the interactive menu decreases or increases based on the horizontal movement of the finger, and
      a width a second subset of the geometric shapes conversely increases or decreases based on the width of the first subset of geometric shapes.

9. The method of claim 2, wherein the first gesture or the second gesture comprise a multi-touch gesture.

10. The method of claim 1, wherein the first gesture comprises a finger of the user moving in a circular direction starting from the first location and ending at the second location on the screen.

11. The method of claim 1, further comprising, after determining the selection of the identified menu option, transitioning from the UI of the first application to a UI associated with the identified menu option.

12. The method of claim 1, wherein the user input indicating completion of the second gesture corresponds to:
   user input indicating completion of the continuous path; or
   user input indicating a long hold at the third location.

13. The method of claim 12, wherein, upon detecting the user input indicating completion of the continuous path:
   the interactive menu disappears; or
   another window of the interactive menu appears.

14. One or more computer-readable non-transitory storage media embodying software that is operable when executed to:
   present a user interface (UI) of a first application on a screen of a computing device;
   detect user input tracing a continuous path, the path comprising a first gesture extending from a first location to a second location on the screen followed by a second gesture extending from the second location to a third location on the screen, the second gesture being different from the first gesture;
   display, responsive to detecting the first gesture, an interactive menu of the first application at a fourth location different from the first, second, and third locations, the interactive menu comprising a plurality of objects corresponding to a plurality of menu options, respectively, wherein the plurality of objects are aligned along a plurality of respective horizontal positions across the screen, wherein each of the plurality of objects moves into view at its respective horizontal position, one by one, from a top of the screen toward a bottom of the screen into a respective vertical position on the interactive menu while maintaining its respective horizontal position, and wherein a shape of the interactive menu changes based on the first gesture and the second gesture;

identify, responsive to detecting the second gesture, one of the menu options, wherein a shape of the interactive menu located at the fourth location changes based on the first gesture and the second gesture, wherein the change of the shape of the interactive menu comprises at least a deformation of a bottom portion of the interactive menu corresponding to the third location, and wherein the object corresponding to the identified menu option moves from a first vertical position toward the bottom of the screen into a second vertical position on the interactive menu while maintaining its respective horizontal position; and determine, responsive to detecting user input indicating completion of the second gesture, selection of the identified menu option.

15. The media of claim 14,
wherein the interactive menu slides into view from a first side of the screen based on the first gesture such that the interactive menu extends in length in a first direction,
wherein the first gesture comprises a finger of the user moving in the first direction toward a second side of the screen, and
wherein the interactive menu extending in length in the first direction comprises the interactive menu extending toward the second side of the screen.

16. The media of claim 15,
wherein the shape of the interactive menu comprises a composite shape created by joining two or more geometric shapes along one or more medians;
wherein the second gesture comprises the finger of the user moving along a first second direction toward a first third side of the screen, a second fourth side of the screen, or a combination thereof; and
wherein the deformation of the bottom portion of the interactive menu is based on the second gesture such that
a position of one of the one or more medians along with respect to an axis orthogonal to the first second direction corresponds to a current position of the detected user input during the second gesture,
a width of a first subset of the geometric shapes of the interactive menu decreases or increases based on the horizontal movement of the finger, and
a width a second subset of the geometric shapes conversely increases or decreases based on the width of the first subset of geometric shapes.

17. The media of claim 14, wherein the software is further operable when executed to, after determining the selection of the identified menu option, transition from the UI of the first application to a UI associated with the identified menu option.

18. A system comprising: one or more processors; and a memory coupled to the one or more processors comprising instructions executable by the one or more processors, the one or more processors being operable when executing the instructions to:
present a user interface (UI) of a first application on a screen of a computing device;
detect user input tracing a continuous path, the path comprising a first gesture extending from a first location to a second location on the screen followed by a second gesture extending from the second location to a third location on the screen, the second gesture being different from the first gesture;

display, responsive to detecting the first gesture, an interactive menu of the first application at a fourth location different from the first, second, and third locations, the interactive menu comprising a plurality of objects corresponding to a plurality of menu options, respectively, wherein the plurality of objects are aligned along a plurality of respective horizontal positions across the screen, wherein each of the plurality of objects moves into view at its respective horizontal position, one by one, from a top of the screen toward a bottom of the screen into a respective vertical position on the interactive menu while maintaining its respective horizontal position, and wherein a shape of the interactive menu changes based on the first gesture and the second gesture;

identify, responsive to detecting the second gesture, one of the menu options, wherein a shape of the interactive menu located at the fourth location changes based on the first gesture and the second gesture, wherein the change of the shape of the interactive menu comprises at least a deformation of a bottom portion of the interactive menu corresponding to the third location, and wherein the object corresponding to the identified menu option moves from a first vertical position toward the bottom of the screen into a second vertical position on the interactive menu while maintaining its respective horizontal position; and determine, responsive to detecting user input indicating completion of the second gesture, selection of the identified menu option.

19. The system of claim 18,
wherein the interactive menu slides into view from a first side of the screen based on the first gesture such that the interactive menu extends in length in a first direction,
wherein the first gesture comprises a finger of the user moving in the first direction toward a second side of the screen, and
wherein the interactive menu extending in length in the first direction comprises the interactive menu extending toward the second side of the screen.

20. The system of claim 19, wherein the shape of the interactive menu comprises a composite shape created by joining two or more geometric shapes along one or more medians;
wherein the second gesture comprises the finger of the user moving along a first second direction toward a first third side of the screen, a second fourth side of the screen, or a combination thereof; and
wherein the deformation of the bottom portion of the interactive menu is based on the second gesture such that
a position of one of the one or more medians along with respect to an axis orthogonal to the first second direction corresponds to a current position of the detected user input during the second gesture,
a width of a first subset of the geometric shapes of the interactive menu decreases or increases based on the horizontal movement of the finger, and
a width a second subset of the geometric shapes conversely increases or decreases based on the width of the first subset of geometric shapes.

* * * * *